United States Patent
Schneider et al.

(10) Patent No.: US 9,027,440 B2
(45) Date of Patent: May 12, 2015

(54) VEHICULAR TRANSMISSION WITH POWER TAKE-OFF UNIT

(71) Applicant: ZF Friedrichshafen AG, Friedrichshafen (DE)

(72) Inventors: Thomas Schneider, Tettnang (DE); Uwe Firzlaff, Uhldingen (DE); Franz Schmidberger, Meckenbeuren (DE); Markus Hoher, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 13/678,599

(22) Filed: Nov. 16, 2012

(65) Prior Publication Data

US 2013/0133451 A1 May 30, 2013

(30) Foreign Application Priority Data

Nov. 28, 2011 (DE) .......................... 10 2011 087 163

(51) Int. Cl.
| | | |
|---|---|---|
| F16H 37/06 | (2006.01) | |
| F16H 3/02 | (2006.01) | |
| B60K 6/405 | (2007.10) | |
| B60K 6/48 | (2007.10) | |
| F16H 3/00 | (2006.01) | |
| F16H 3/089 | (2006.01) | |

(52) U.S. Cl.
CPC ............. *F16H 3/02* (2013.01); *Y10T 74/19233* (2015.01); *B60K 6/405* (2013.01); *B60K 6/48* (2013.01); *F16H 3/006* (2013.01); *B60K 2006/4808* (2013.01); *F16H 2200/0017* (2013.01); *F16H 2200/003* (2013.01); *F16H 2200/0056* (2013.01); *F16H 3/089* (2013.01); *Y02T 10/6221* (2013.01); *Y02T 10/626* (2013.01)

(58) Field of Classification Search
USPC ......................................... 74/331, 661, 665 B
See application file for complete search history.

(56) References Cited

U.S. PATENT DOCUMENTS

| 5,074,829 A | * | 12/1991 | Menge, Sr. ..................... 475/182 |
| 5,655,990 A | * | 8/1997 | Ooyama et al. .................. 477/15 |
| 6,044,931 A | | 4/2000 | Reed, Jr. et al. |
| 6,634,247 B2 | * | 10/2003 | Pels et al. ......................... 74/329 |

(Continued)

FOREIGN PATENT DOCUMENTS

| DE | 10 2004 046 297 A1 | 3/2006 |
| DE | 10 2004 045 425 A1 | 4/2006 |

(Continued)

OTHER PUBLICATIONS

German Search Report Corresponding to DE 10 2011 087 164.0, Date: Jun. 21, 2011.

*Primary Examiner* — Ha D Ho
(74) *Attorney, Agent, or Firm* — Davis & Bujold, P.L.L.C.; Michael J. Bujold

(57) ABSTRACT

A transmission, for a motor vehicle with an auxiliary drive (EM), having a first housing part (2a), a second housing part, a transmission shaft (GW), an auxiliary drive shaft which can be driven by the auxiliary drive (EM), a lay shaft (VW) that is positioned axially parallel to the transmission shaft (GW) and coaxial to the auxiliary drive shaft. The lay shaft (VW) is connected, via a spur wheel stage (Z22, Z23) with the transmission shaft (GW), and the lay shaft (VW) is connected in a rotationally fixed manner with the auxiliary drive shaft and is supported on both sides of the spur wheel stage (Z22, Z23) in a bearing device (9).

19 Claims, 4 Drawing Sheets

(56) References Cited

U.S. PATENT DOCUMENTS

| | | | |
|---|---|---|---|
| 7,600,602 B2 * | 10/2009 | Kuroumaru et al. | 180/444 |
| 7,837,453 B2 | 11/2010 | Barthel et al. | |
| 8,051,733 B2 * | 11/2011 | Mizuno et al. | 74/335 |
| 8,257,221 B2 * | 9/2012 | Leufgen | 477/3 |
| 8,522,635 B2 * | 9/2013 | Pastorello et al. | 74/335 |
| 2006/0078437 A1 | 4/2006 | Gumpoltsberger et al. | |
| 2010/0307883 A1 | 12/2010 | Patzner et al. | |

FOREIGN PATENT DOCUMENTS

| | | |
|---|---|---|
| DE | 10 2004 055 121 A1 | 5/2006 |
| DE | 10 2005 042 360 A1 | 3/2007 |
| DE | 10 2006 026 631 A1 | 12/2007 |
| DE | 10 2008 005 239 A1 | 7/2009 |
| DE | 10 2008 031 456 A1 | 1/2010 |
| EP | 1 954 965 B1 | 8/2009 |

* cited by examiner

VEHICULAR TRANSMISSION WITH POWER TAKE-OFF UNIT

This application claims priority from German patent application serial no. 10 2011 087 163.2 filed Nov. 28, 2011.

FIELD OF THE INVENTION

The invention concerns a transmission of a motor vehicle with an auxiliary drive, as well as a device to drive a transmission shaft by an auxiliary drive.

BACKGROUND OF THE INVENTION

It is known that today's motor vehicles, so-called hybrid vehicles, have beside the combustion engine as the drive machine an auxiliary drive in a form of an electric machine, whereby the auxiliary drive is attached to the transmission of the motor vehicle and drives the transmission. Attaching the electric machine to one of the transmission shafts causes problems when not enough construction space is available for a bearing of the drive shaft of the electric machine. Furthermore, the rotational speed of the electric machine needs to be reduced, meaning that an additional gear reduction stage is necessary.

SUMMARY OF THE INVENTION

It is the task of the present invention to combine an auxiliary drive, especially an electric machine, with a motor vehicle transmission and one of the transmission shafts, especially under insufficient construction space conditions.

In a first aspect of the invention, a transmission shaft in a motor vehicle transmission with an auxiliary drive is driven via a spur gear stage by the auxiliary drive. The spur gear stage comprises of a lay shaft, positioned axially parallel to the transmission shaft, which is detachably connected with the drive shaft of the auxiliary drive, the auxiliary drive shaft, and which has a bearing device on both sides of the spur gear stage. This results in a compact configuration of the auxiliary drive at the transmission. Due to the bearing device, which is supported at the transmission housing, a stable and statically determined bearing of the lay shaft can be accomplished, whereby a clean gear meshing and a low noise run of the meshing gear wheels is given. Through the double bearing of the lay shaft, a significant improvement in comparison to a flying bearing of a driving pinion at the auxiliary drive shaft can be accomplished. It is also advantageous that the bearing device with the lay shaft can be pre-assembled with the transmission, so that at the end, just the auxiliary drive needs to be attached at the transmission housing and the auxiliary drive shaft needs to be connected with the lay shaft.

In a preferred embodiment, the bearing device has two coaxially positioned bearing boreholes, which serve to accommodate roller bearings for the pinion shaft.

In another preferred embodiment, the bearing device can be supported at the first housing part. Hereby, the resulting forces and torques which result from the gear meshing and the torque transfer, are induced into the transmission housing.

In another preferred embodiment, the bearing device has an attachment flange in the manner of a bearing plate. Thus, forces and torques of the bearing device can be induced through a large area into the transmission housing.

In another preferred embodiment, the bearing device is designed as a separate part which is detachably connected, preferably via screws, with the transmission housing. Hereby, the bearing device can be pre-manufactured as a single part.

In another preferred embodiment, the bearing device is designed as one piece with the first housing part, for instance as a casting part, which is then machined.

In another preferred embodiment, the lay shaft is designed as a pinion shaft, meaning that the pinion is designed as single piece with the lay shaft. Thus, the manufacturing is simpler.

In another preferred embodiment, the lay shaft is connected via a connector, for instance a polygon or splined shaft profile, with the auxiliary drive shaft. This means that both shafts can be easily assembled in the axial direction, whereby a pre-assembly of the bearing device with a pinion shaft and bearings is possible. Furthermore, a simple exchange of the auxiliary drive becomes possible.

In an additional preferred embodiment, the bearing device has a hollow cylindrical section on a longitudinal axis, wherein the two bearing boreholes are coaxially positioned along the longitudinal axis and the hollow cylindrical section has a window, i.e., has a recess in the area of the tooth engagement of the spur wheel section. The hollow cylindrical section creates a large resistance torque to accommodate the bearing forces, on the other hand, the window allows engagement between the pinion and the gear wheel at the transmission shaft.

In an additional preferred embodiment, the transmission is designed as double clutch transmission with two coaxially positioned drive shafts which can be driven, via the pinion gear stage, by the auxiliary drive. It creates the advantage that the double clutch transmissions which are used in today's motor vehicles can be adapted to a hybrid drive, meaning an electrical auxiliary drive, meaning that they can be "hybridized".

In an additional aspect of the invention, a device for driving a transmission shaft is provided by an auxiliary drive, a lay shaft for driving a transmission shaft is mounted, via a double spur gear stage, in a bearing device. The advantage hereby is a compact and axially parallel bearing of the lay shaft in the bearing device, which is part of the auxiliary drive. The design of the bearing device matches with the above described bearing device.

BRIEF DESCRIPTION OF THE DRAWINGS

An example of the embodiment of the invention is presented in the drawings and is further described in the following, wherein additional characteristics and/or advantages can arise from the description or the drawings. These show.

DETAILED DESCRIPTION OF THE PREFERRED EMBODIMENTS

Figure 1:
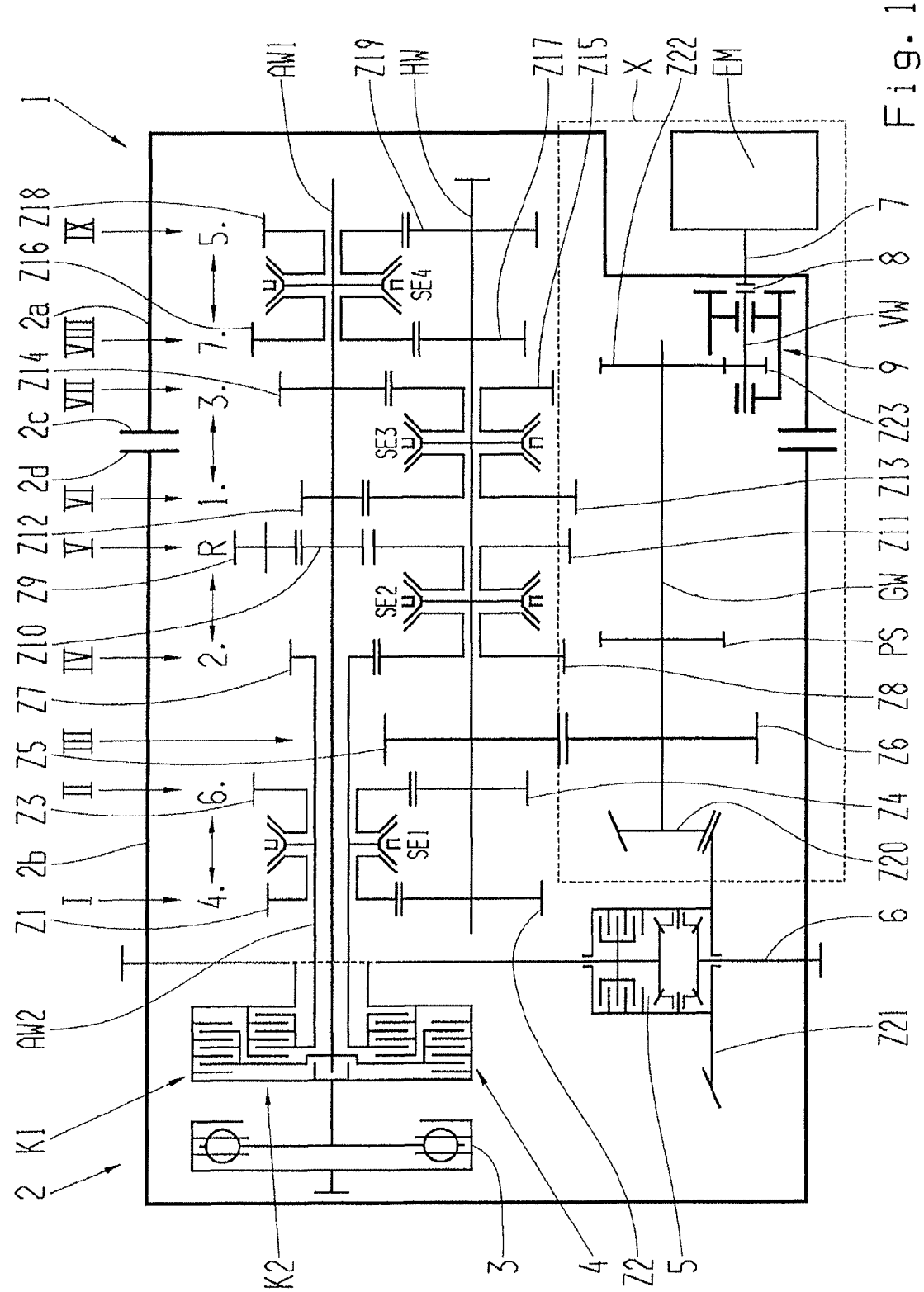
FIG. 1 a schematic of a double clutch transmission of a motor vehicle with an electric machine as an auxiliary drive, FIG. 2 a section X from FIG. 1 with a constructive presentation of the attachment of the auxiliary drive to a transmission shaft, FIG. 3 an enlarged section of FIG. 2 with an auxiliary drive and lay shaft, but without the housing, and FIG. 4 a perspective view of a rear housing part and the connection of the auxiliary drive, via a spur gear step, to the gear shaft.

FIG. 1 shows a schematic presentation of a double clutch transmission 1 for a motor vehicle with an auxiliary drive, designed as an electric machine EM. The double clutch transmission 1 comprises a two-part transmission housing 2 with a rear housing part 2a and a front housing part 2b, which are connected with each other via a housing flange 2c, 2d. In the transmission housing 2, meaning in the front housing part 2b, at the drive side of a not shown combustion engine of the motor vehicle, a driven torsion vibration damper 3 as well as a double clutch 4 are positioned, comprising of a first outer clutch K1 and a second, inner clutch K2. The double clutch 4, which is driven on the motor side via the torsion vibration damper 3, drives on its own, via a first drive shaft AW1 which is driven by the first clutch K1, a first partial transmission TG1, and driven via a second clutch K2, a second drive shaft AW2, designed as a hollow shaft and positioned coaxial to the first drive shaft AW1, which drives a second partial transmission TG2. Parallel to the drive shaft AW1 are a main shaft HW and a transmission shaft GW, also called output shaft GW, positioned in the transmission housing 2. A gear step for the fourth gear is positioned on the hollow shaft or rather the second drive shaft AW2 in a first wheel plane I, a gear step for the sixth gear in a second wheel plane II, and a gear step for the second gear is positioned in a wheel plane IV. The gear step 4 comprises two gear wheels Z1, Z2, the gear step 6 has two gear wheels Z3, Z4, and the gear step 2 has two gear wheels Z7, Z8, wherein the gear wheels Z1, Z3 on the hollow shaft AW2 are designed as idler gears and can be shifted selectively by a shifting device SE1 which is designed as double synchronization. The gear wheels Z2, Z4 which are positioned on the main shaft HW are designed as fixed gears. The gear steps for the even gears 4, 6, 2 which are driven by the second clutch K2, form the second partial transmission TG2. The gear wheels Z9, Z10, Z11 are positioned on the first drive shaft AW1 and on the main shaft HW in a fifth wheel plane V for the gear step R for a reverse gear, the gear wheels Z12, Z13 are positioned in a sixth wheel plane VI for the gear step for the first gear, and the gear wheels Z14, Z15 for the gear step for the third gear are positioned in a seventh wheel plane VII. The gear wheels Z8, Z11 are designed as idler gears and can be selectively shifted by a shifting device SE2 which is designed as a double synchronization. The gear wheels Z13, Z15 on the main shaft HW are designed as idler gears and can be selectively shifted by a third shifting device SE3 which is designed as a double synchronization. Two gear wheels Z16, Z17 are positioned in an eighth wheel plane VIII as the gear step for the seventh gear and two gear wheels Z18, Z19 are positioned in a ninth wheel plane IX for the gear step for the fifth gear. The gear wheels Z16, Z18 are designed as idler gears and can be selectively by a fourth shift device SE4. The gear steps for the odd gears 1, 3, 7, 5, which are driven by the first clutch K1, form the first partial transmission TG1.

The output from the main shaft HW to the output shaft GW takes place via the gear wheels Z5, Z6 as an output constant, meaning a spur gear step with a constant gear ratio between the main shaft AW and the output shaft GW. A wheel axle 6 of a motor vehicle is driven by the output shaft GW, via a bevel pinion gear Z20 and a ring gear Z21, as well as a differential transmission 5. The main shaft HW can be used as an optional additional output for instance in the case of a four-wheel-drive of a vehicle.

The functionality of a double clutch transmission which shifts without an interruption in the tractive force is known in the state of the art and is not explained here. The numbers and double arrows which in FIG. 1 are assigned to the wheel planes I, II, and IV to IX, indicate the respective gear steps and the shifting directions for the shift devices SE1 to SE4 and are therefore self-explanatory.

The electric machine EM is connected as an auxiliary drive to the double clutch transmission 1. The electric machine EM has a motor shaft 7, also called auxiliary drive shaft 7, which drives a lay shaft VW on which a pinion Z23 is positioned and which meshes with a gear wheel Z22 on the output shaft GW. The lay shaft VW is coaxially positioned with the motor shaft 7 and connected to it via a connector 8. The lay shaft VW with the pinion Z23 is supported on both sides of the pinion Z23 in a bearing device 9 which is attached to the rear housing part 2*a*. Thus, the electric machine EM drives, via the spur wheel step Z23, Z22 (drive constant), the transmission shaft GW.

Figure 2:
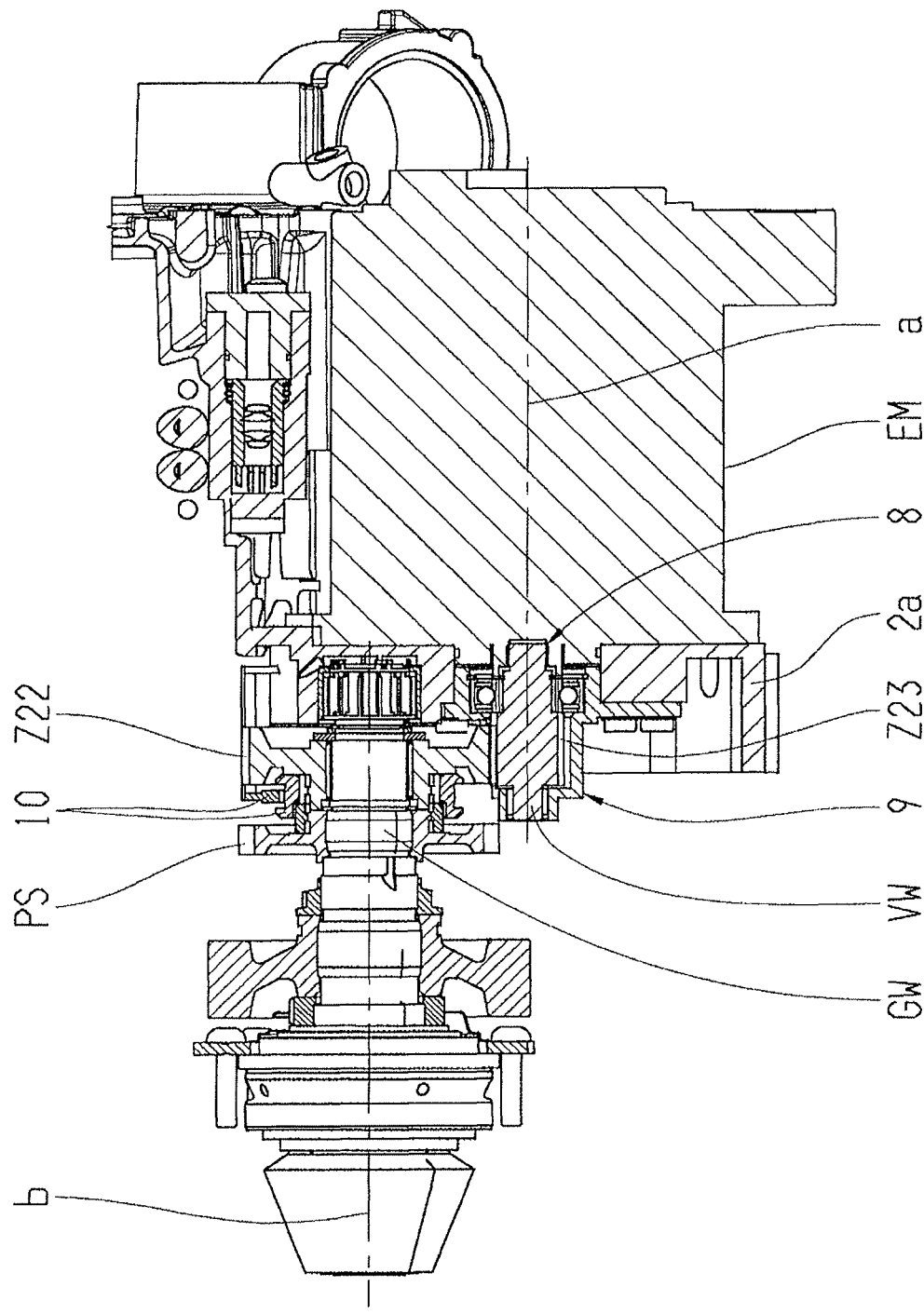

FIG. 2 shows a section X of the double clutch transmission 1, which is marked in FIG. 1 with dotted lines, wherein the same reference numbers as in FIG. 1 are being used for the same parts. FIG. 2 shows a constructive design of the schematic presentation in FIG. 1. The auxiliary drive, which is designed as an electric machine EM, is connected with the rear housing part 2*a* and drives, via the connector 8, the lay shaft VW which is designed as a pinion shaft. The bearing device 9 is attached to the housing part 2*a* and is centered, with reference to the rotational axis a of the auxiliary drive EM. The lay shaft VW, which is positioned in the bearing device 9, is coaxially aligned with the rotational axis a. The pinion Z23 meshes with the gear wheel Z22 which is designed as an idler gear and which is positioned on the transmission shaft GW, and the gear wheel Z22 can be connected in a rotationally fixed manner, via a shift element 10, with the transmission shaft GW. A parking lock wheel 11 is also connected in a rotationally fixed manner on the transmission shaft GW and is part of a not shown locking device which locks the drive shaft GW. The bevel pinion gear Z20 meshes with a not shown ring gear Z21 (see FIG. 1). The auxiliary drive EM can therefore, via the shift device 10, be added as an additional drive, wherein the rotational speed of the motor shaft of the electric machine EM is reduced via the spur wheel step Z23, Z22.

Figure 3:
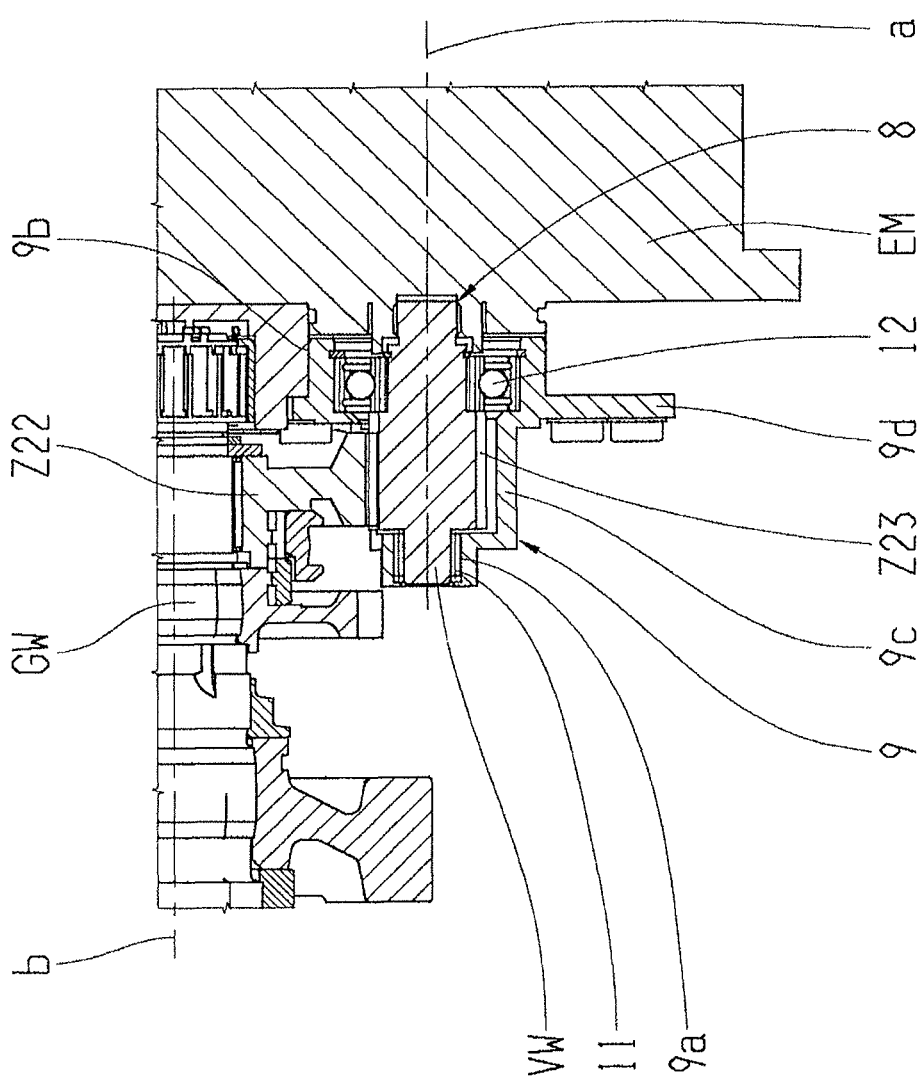

FIG. 3 shows an enlarged section of FIG. 2, but without the rear housing part 2*a*. The bearing device 9, also called a bearing dome, is designed as a hollow cylindrical body with a longitudinal axis a, which corresponds to the rotational axis a of the motor shaft and the pinion shaft VW. A first smaller bearing borehole 9*a* and a second larger bearing borehole 9*b* are positioned in the bearing device 9 coaxial to the longitudinal axis a. Between the two bearing boreholes 9*a*, 9*b*, the bearing device 9 has a hollow cylindrically designed section 9*c*, which is, in the area where the two gear wheels Z22, Z23 engage, designed with an opening, meaning a window. In the area of the second bearing borehole 9*b*, the bearing device has a flange 9*d* which is designed similar to a bearing plate and which serves as a detachable connection, preferably via screws, for the not shown rear housing part 2*a*. Centering of the bearing device 9 with reference to the housing part 2*a*, takes place through a centering stud, which is inserted into a boring of the housing part 2*a*. In the first bearing borehole 9*a*, a first roller bearing 11 is positioned which is designed as a needle bearing, and in the second bearing borehole 9*b*, a second roller bearing 12 is positioned which is designed as a grooved ball bearing, in which the pinion shaft VW has a double sided bearing, meaning on both sides of the pinion Z23. It has to be mentioned that the connector 8 between motor shaft and lay shaft VW or pinion shaft, respectively, is located outside of the two bearings 9*a*, 9*b*, of the neighboring side of the electric machine EM. Thus, a play-free, statically solid bearing of the pinion shaft or lay shaft and—due to this fact—a low noise engagement of the two gear wheels Z22, Z23 is accomplished. The lay shaft VW can be preassembled with the bearing device 9 and the two roller bearings 11, 12 and can be attached to the housing part 2*a*. Thereafter, the auxiliary drive EM with the motor shaft is attached. The connector 8 is connectable in the direction of the rotational axis a and can be designed having a polygon profile or spline shaft profile. The longitudinal axis of the drive shaft GM is marked as b; the longitudinal axis a of the bearing device 9, as well as the bearing boreholes 9a, 9b, is aligned parallel to the longitudinal axis b of the output shaft.

Figure 4:
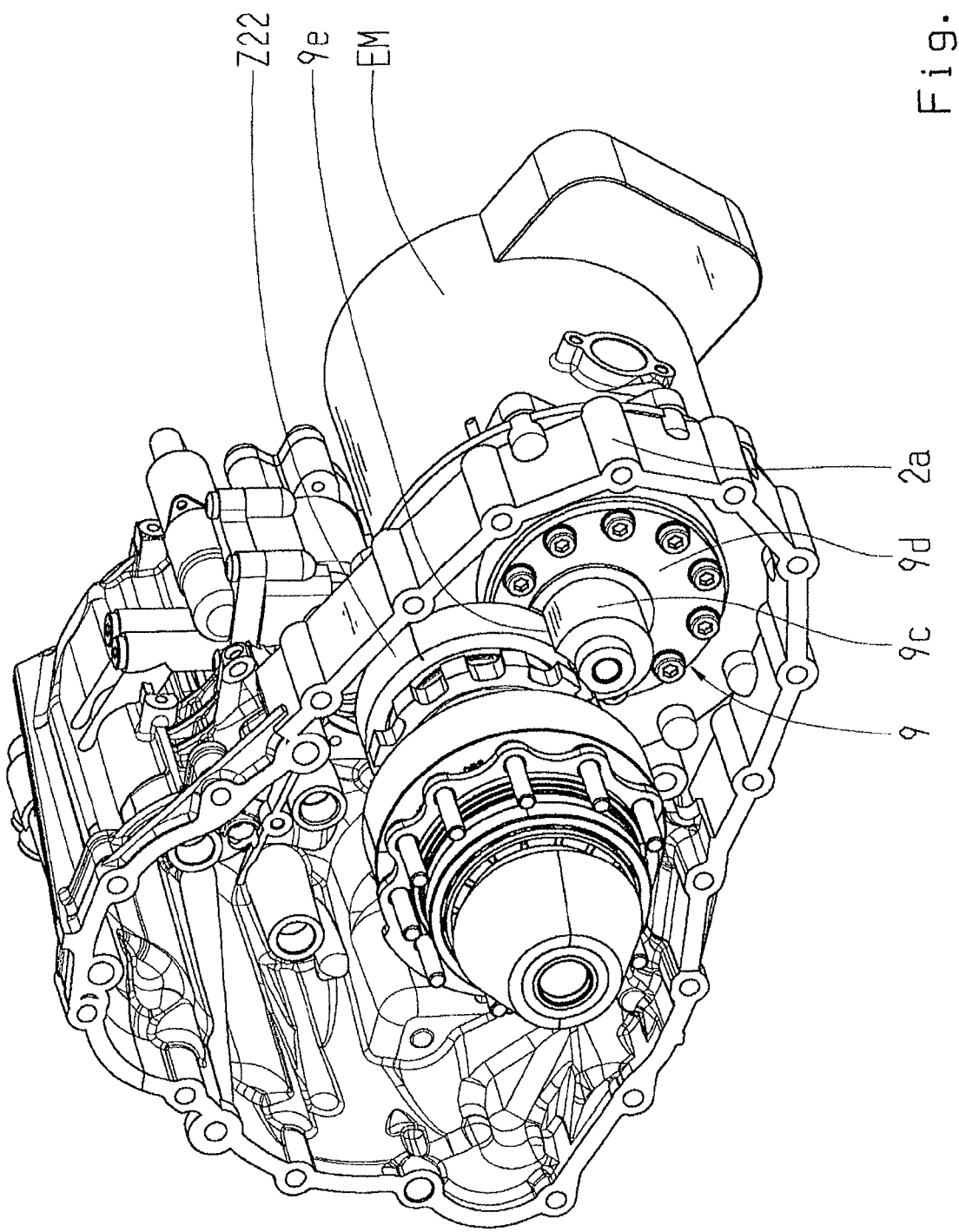

FIG. 4 shows a perspective presentation of the rear housing part 2a in a constructive design, where again the same reference numbers are used for the same parts. The auxiliary drive EM is flanged to the outer side of the rear housing part 2a. The bearing device 9 is positioned at the inner side of the housing part 2a and is screwed to the rear housing part 2a via the flange 9d. One can see from this perspective presentation that the hollow cylindrical section 9c of the bearing device 9, in the area where the gear wheel Z22 meshes, is designed with an opening and has in this area a window 9e. This ensures that, on one side, a solid bearing of the pinion shaft is possible, and on the other side that meshing is possible.

REFERENCE CHARACTERS

1 Double Clutch Transmission
2 Transmission Housing
2a Rear (first) Housing Part
2b Front (second) Housing Part
2c Housing Flange
2d Housing Flange
3 Torsion Vibration Damper
4 Double Clutch
5 Differential
6 Wheel Axle
7 Auxiliary Drive Shaft
8 Connector
9 Bearing Device
9a First Bearing Boring
9b Second Bearing Boring
9c Hollow Cylindrical Section
9d Flange
9e Window
10 Shift Element
11 First Roller Bearing
12 Second Roller bearing
AW1 First Drive Shaft
AW2 Second Drive Shaft
EM Electric Machine
GW Transmission-/Output Shaft
HW Main Shaft
K1 First Clutch
K2 Second Clutch
PS Park Lock Wheel
SE1 First Shift Device
SE2 Second Shift Device
SE3 Third Shift Device
SE4 Fourth Shift Device
TG1 First Partial Transmission
TG2 Second Partial Transmission
VW Lay Shaft
Z1-Z23 $1^{st}$ Gear Wheel to $23^{rd}$ Gear Wheel
a Longitudinal Axis (Lay Shaft)
b Longitudinal Axis (Transmission Shaft)

The invention claimed is:
1. A transmission for a motor vehicle with an auxiliary drive (EM), the transmission comprises a plurality of gear ratios which facilitate receiving torque from an internal combustion engine and supplying output torque to a transmission shaft (GW) to power the motor vehicle in forward and reverse driving directions, the transmission comprising:
a first housing part (2a),
a second housing part (2b),
the transmission shaft (GW),
an auxiliary shaft (7) being drivable by the auxiliary drive (EM) for powering the motor vehicle in the forward and the reverse driving directions,
a lay shaft (VW) lying axially parallel to the transmission shaft (GW) and coaxial with the auxiliary drive shaft (7), and the lay shaft (VW) being connected via a auxiliary spur wheel stage (Z22, Z23) with the transmission shaft (GW),
the lay shaft (VW) being rotationally fixed connected with the auxiliary drive shaft (7) and having a bearing device (9) located on both sides of the auxiliary spur wheel stage (Z22, Z23).

2. The transmission according to claim 1, wherein the bearing device (9) has two bearing boreholes (9a, 9b).

3. The transmission according to claim 1, wherein the bearing device (9) is supported by the first housing part (2a).

4. The transmission according to claim 1, wherein the bearing device (9) has a mounting flange (9d).

5. The transmission according to claim 1, wherein the bearing device (9) is a separate part and is detachably connected with the first housing part (2a).

6. The transmission according to claim 1, wherein the bearing device (9) is formed as a single piece part with the first housing part (2a).

7. The transmission according to claim 1, wherein the lay shaft (VW) is a pinion shaft.

8. The transmission according to claim 2, wherein the lay shaft (VW) is detachably connected with the auxiliary drive (7) by a joinable connector (8) which is movable in an axial direction (a).

9. The transmission according to claim 8, wherein the connector (8) is positioned axially outside of the two bearing boreholes (9a, 9b) on a side which faces the auxiliary drive (EM).

10. The transmission according to claim 2, wherein the bearing device (9) comprises a hollow cylindrical section (9c) with a longitudinal axis (a), the two bearing boreholes (9a, 9b) are positioned coaxial with the longitudinal axis (a), and the hollow cylindrical section (9c) has a window (9e), in an meshing area of the auxiliary spur wheel stage (Z22, Z23).

11. The transmission according to claim 1, wherein the transmission is a double clutch transmission (1) with two coaxially positioned drive shafts (AW1, AW2), a main shaft (HW) and the transmission shaft (GW), and the transmission shaft (GW) is drivable, via the auxiliary spur wheel stage (Z22, Z23), by the auxiliary drive (EM).

12. The transmission according to claim 1, wherein a connector (8) directly connects the lay shaft (VW) to the auxiliary drive (7).

13. The transmission according to claim 1, wherein
the transmission shaft (GW) is accommodated within both the first and the second housing parts (2a, 2b),
the lay shaft (VW) and the bearing device (9) are accommodated within the first housing part (2a),
the drive shaft (7) extends through the first housing part (2a) so that the drive shaft (7) is located at least partially inside and at least partially outside the first housing part (2a), and
the transmission shaft (GW) the auxiliary drive (EM) is located outside both of the first and the second housing parts (2a, 2b).

14. The transmission according to claim 13, wherein the lay shaft (VW) and the bearing device (9) are contained within the first housing part (2a) and the drive shaft (7) is extends at least partially into an interior of the first housing part (2a).

15. The transmission according to claim 1, wherein the transmission shaft (GW) is coupled to the transmission via a transmission spur wheel stage (Z5, Z6) so that torque is supplied to the transmission shaft (GW) via both the transmission and the auxiliary drive (EM), and the transmission shaft (GW) supports a gear (Z20) which drives a wheel axle (6) of the motor vehicle.

16. A device for driving a transmission shaft (GW), which has a bearing in a transmission housing (2), with an auxiliary drive (EM) having an auxiliary drive shaft (7) and a rotational axis (a), the device comprising a plurality of different gear ratios which facilitate receiving torque from an internal combustion engine and supplying output torque to the transmission shaft (GW) which is connectable to a wheel axle of motor vehicle and for supplying rotation drive thereto and moving the vehicle in forward and reverse driving directions, the rotational axis (a) of the auxiliary drive (EM) being positioned offset with respect to a longitudinal axis (b) of the transmission shaft (GW), a bearing device (9) and a lay shaft (VW) being assigned to the auxiliary drive (EM), the lay shaft (VW) being coaxially positioned with the rotational axis (a) and rotationally fixedly connected with the auxiliary drive shaft (7), the lay shaft (VW) having a pinion (Z23) meshing with a gear wheel (Z22) which is positioned on the transmission shaft (GW) and having a bearing located on both sides of the pinion (Z23) in the bearing device (9).

17. The device according to claim 16, wherein the transmission shaft (GW) is coupled to the transmission via a transmission spur wheel stage (Z5, Z6) so that torque is supplied to the transmission shaft (GW) via both the transmission and the auxiliary drive (EM), and the transmission shaft (GW) supports a gear (Z20) which drives the wheel axle (6) of the motor vehicle.

18. A device for driving a transmission shaft (GW), which has a bearing in a transmission housing (2) having a first housing part (2a) and a second housing part (2b), with an auxiliary drive (EM) having an auxiliary drive shaft (7) and a rotational axis (a), the device comprising a plurality of different gear ratios which facilitate receiving torque from an internal combustion engine and supplying output torque to the transmission shaft (GW) which is connectable to a wheel axle of motor vehicle and for supplying rotation drive thereto and moving the vehicle in forward and reverse driving directions, the rotational axis (a) of the auxiliary drive (EM) being positioned offset to a longitudinal axis (b) of the transmission shaft (GW), a bearing device (9) and a lay shaft (VW) being assigned to the auxiliary drive (EM), transmission the lay shaft (VW) being coaxially positioned with the rotational axis (a) and rotationally fixedly connected with the auxiliary drive shaft (7), the lay shaft (VW) having a pinion (Z23) meshing with a gear wheel (Z22) which is positioned on the transmission shaft (GW), and having a bearing located on both sides of the pinion (Z23) in the bearing device (9), the bearing device (9) having two bearing boreholes (9a, 9b) and being supported by the first housing part (2a), and the bearing device (9) being detachably connected, via a mounting flange (9d), with the first housing part (2a).

19. The transmission according to claim 18, wherein the transmission shaft (GW) is coupled to the transmission via a transmission spur wheel stage (Z5, Z6) so that torque is supplied to the transmission shaft (GW) via both the transmission and the auxiliary drive (EM), and the transmission shaft (GW) supports a gear (Z20) which drives the wheel axle (6) of the motor vehicle.

* * * * *